United States Patent [19]

Sumida et al.

[11] Patent Number: 4,660,784
[45] Date of Patent: Apr. 28, 1987

[54] TAP CARTRIDGE

[75] Inventors: Takashi Sumida, Takatsuki; Sigeo Sasaki, Kyoto; Takao Ketori, Osaka; Kazuhiro Fujita, Nagaokakyo; Kenji Ogiro, Yokohama, all of Japan

[73] Assignees: Hitachi Maxell, Ltd., Osaka; Hitachi, Ltd., Tokyo, both of Japan

[21] Appl. No.: 739,297

[22] Filed: May 30, 1985

[30] Foreign Application Priority Data

May 30, 1984 [JP] Japan ................................ 59-110274

[51] Int. Cl.⁴ .......................... G03B 1/04; G11B 15/32
[52] U.S. Cl. ..................................... 242/198; 360/132
[58] Field of Search ............... 242/198, 199, 200, 197; 360/96.1, 132

[56] References Cited

U.S. PATENT DOCUMENTS

3,894,796  7/1975  Cook et al. .................. 242/198 X
4,466,583  8/1984  Giannis et al. .................. 242/198

Primary Examiner—John M. Jillions
Assistant Examiner—David Werner
Attorney, Agent, or Firm—Birch, Stewart, Kolasch & Birch

[57] ABSTRACT

A tape cartridge of the type having a pocket for drawing out a recording tape from the cartridge for tape loading and a shutter slidably mounted on the bottom portion of the cartridge for opening and closing the bottom opening of the pocket, and a plurality of ribs extending in a frontward and backward direction on the inner face of the shutter so as to assure a smooth sliding movement of the shutter.

8 Claims, 32 Drawing Figures

TAP CARTRIDGE

BACKGROUND OF THE INVENTION

1. Field of the Invention

The present invention relates to a tape cartridge, and more particularly to a tape cartridge having a pocket for tape loading.

2. Description of Related Art

In a tape cartridge such as a video tape cartridge, there is provided an opened portion so called a pocket in a front portion of the cartridge case for allowing entrance of a tape loading member of a tape player. Although in the video tape cartridge of this type, there is provided a front lid for closing the front portion of the cartridge case when not use, dust or foreign matter can enter the interior of the cartridge case through the opening of the pocket defined on the bottom wall of the cartridge case, thereby causing the recording tape in the cartridge case to be stained or scratched.

In order to prevent the above mentioned drawback Japanese patent applications Ser. Nos. 238426/1983, 243272/1983 and 243273/1983 disclose arrangements to shut the opening of the pocket by a shutter member slidaby mounted on the bottom wall of the cartridge case so that the shutter member closes the lower portion of the pocket when the tape cartridge is not used. In this arrangement, the shutter member can be moved backward for opening the pocket when the cartridge case is mounted on the tape player. In another feature of the proposed arrangement, a shutter plate is mounted on the exterior of the cartridge case as shown in Japanese patent application Ser. No. 32104/1984.

In the case where the slidable shutter member is mounted with the entire surface of the shutter member severely engaged with the bottom face of the cartridge case, if there is even a slight error in the shape of the cartridge case or the shutter member, internal deformation or thermal deformation thereof, friction between the shutter member and the cartridge case increases, thereby preventing smooth movement of the shutter member. To the contrary, if there is defined a large gap between the cartridge over the entire area of the shutter member, there tends to occur improper engagement between the shutter and cartridge case, thereby resulting in a malfunction of the shutter member.

SUMMARY OF THE INVENTION

An essential object of the present invention is to provide a tape cartridge having a shutter member for closing and opening the pocket portion of the cartridge case in which a smooth movement of the shutter member can be assured.

In particular, in a case where the shutter member is mounted on the exterior of the bottom of the cartridge case, dust or foreign matter may easily enter in a gap between the shutter member and the cartridge case, preventing smooth movement of the shutter member and thus must be avoided.

Another object of the present invention is to provide a tape cartridge which assures smooth movement of the shutter member even if foreign matter has entered in the gap between the shutter member and the cartridge case.

DETAILED DESCRIPTION OF THE PREFERRED EMBODIMENTS

Referring to FIGS. 1 through 13 showing a tape cartridge for use in recording audio signals in digital form, a cartridge case 1 made of plastic resin material is formed by a top case half 1a and a bottom case half 1b both assembled together in a butting manner and connected by screws, to provide a tape chamber for accommodating a pair of tape hubs 3 on which a recording tape 2 is wound. The hubs 3 are rotatably placed above a pair of drive shaft insertion holes 5, whereby in the case where the cartridge case 1 is mounted on a tape player, drive shafts (not shown) can be entered in the cartridge case through the drive shaft insertion holes 5 and engaged with the hubs 3. There are provided a pair of tape guide members 6 on both the left and right portions of the cartridge case 1 and the recording tape 2 can be released for one of the hubs and taken up by the other hub passing through the tape guide members 6.

FRONT LID

Figures 9, 10, 11:
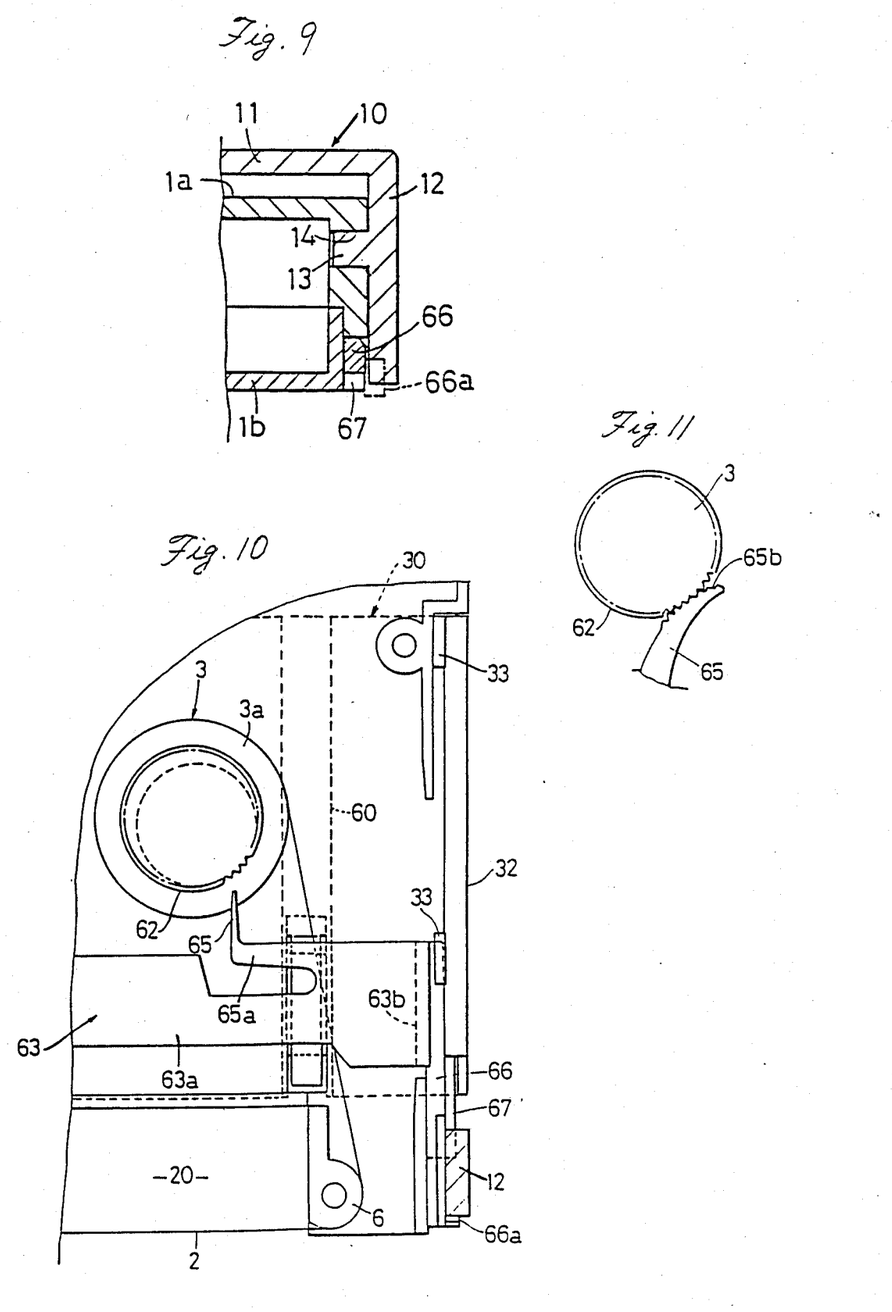
FIG. 9 is a cross sectional view taken along the lines C—C in FIG. 8.
FIG. 10 is a partial top plan view showing a hub stopping mechanism when the cartridge in use.
FIG. 11 is a partial plan view of the hub stopping mechanism when a brake is applied to a hub.
Figure 12:
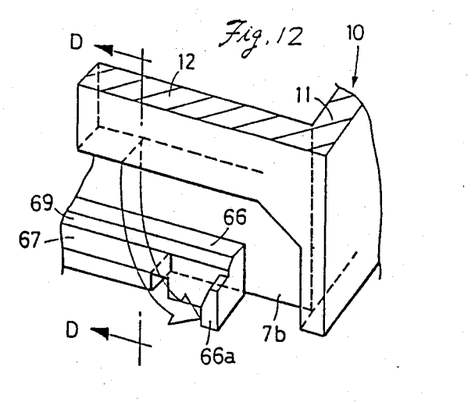
FIG. 12 is a partial perspective view showing a manner of operation of the hub stopping mechanism.
Figure 13:
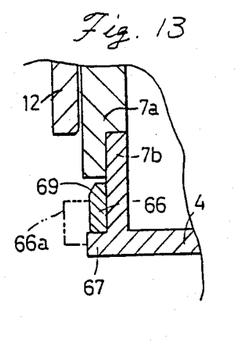
FIG. 13 is a partial cross sectional view taken along the lines D—D in FIG. 12.

A front lid 10 is provided in the front portion of the cartridge 1 for protection of the recording tape 2. The front lid 10 comprises a front plate 11 situated in the front portion between the left end portion and the right end portion of the cartridge for closing the front face of the cartridge 1, connecting arms 12 projected backward from the left and right end portions of the front plate 11 and supporting shafts 13 projected inwardly from the inner surfaces of the connecting arms 12. The front lid 10 is made of plastic resin material. The front lid 10 is mounted on the cartridge 1 with both the connecting arms 12 fitted to the left and right side walls of the cartridge 1 having the supporting shafts 13 inserted in holes 14 as shown in FIG. 9, so that the front lid 10 is movable between a closed position and an opened position. The front lid 10 is biassed to the closed position by means of spring member (not shown).

When the cartridge is not in use, the front lid 10 is in the closed position so as to cover the recording tape 2 for protection thereof. When the cartridge is mounted on the tape player, the front lid 10 can be opened to allow for the drawing of the recording tape 2 from the cartridge 1.

A pocket 20 in the form of an opening is defined in the central portion of the cartridge 1 for tape loading. The upper portion of the pocket 20 is closed by the top wall 8 of the top case half 1a with the front portion and the lower portion of the pocket 20 being opened. When the cartridge 1 is mounted on a tape player, the front lid 10 can be moved upward and the tape loading member of the tape player enters through the pocket 20 draws the recording tape 2 from the cartridge 1.

SHUTTER

There is provided a shutter 30 in a bottom wall 4 of the bottom case half 1b for covering the lower opening of the pocket 20.

Figure 1A:
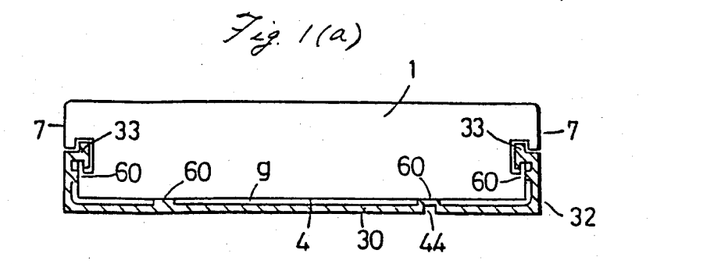
FIG. 1(a) is a cross sectional view showing one embodiment of a cartridge case according to the present invention.
Figure 1B:
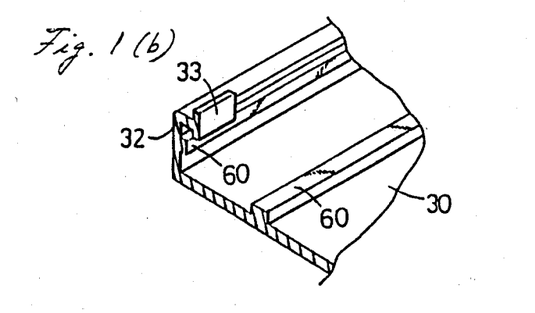
FIG. 1(b) is a partial perspective view showing an essential portion of the cartridge case shown in FIG. 1(a)
Figure 2:
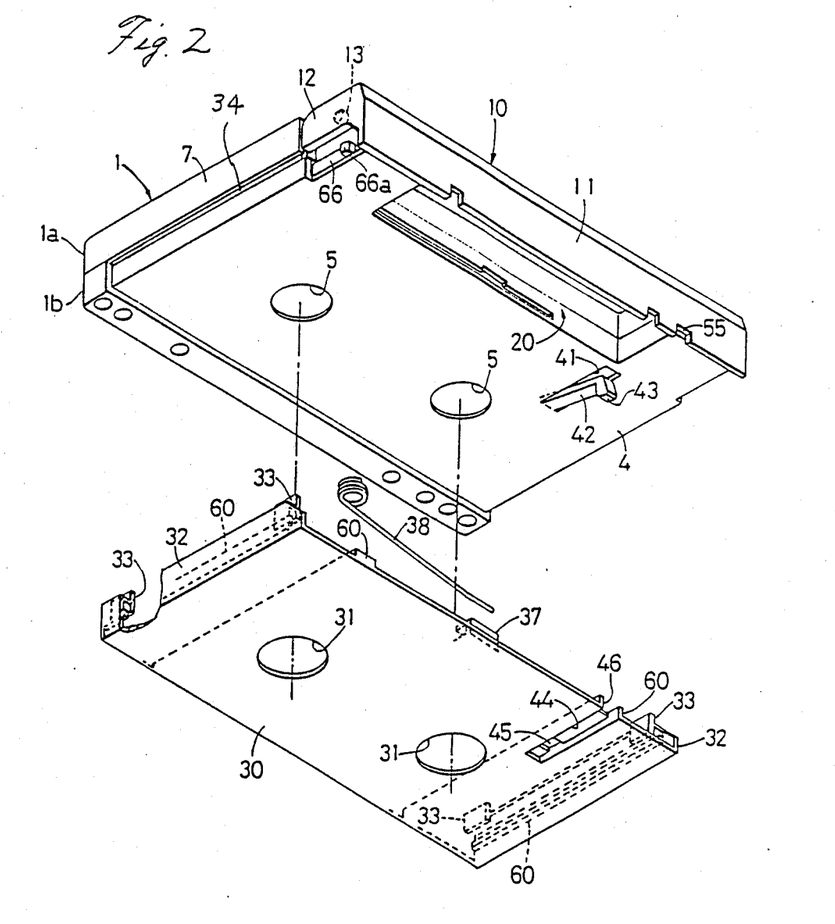
FIG. 2 is an exploded view of the cartridge case viewed from below.

Referring to FIGS. 1(a), 1(b) and 2, the shutter 30 is composed of a main plate 39 made of a flat plate generally conforming to the bottom wall 4 and a pair of vertical walls 32 standing from the both side edges of the main plate 39. A pair of holes 31 are defined in the main plate 39 corresponding to the drive shaft insertion holes 5 on the central portion of the main plate.

The shutter 30 is formed of plastic resin material and preferably polyacetal resin is used. The shutter 30 is mounted on the bottom of the bottom case half 1b from below so as to be moved in the front and back directions with the vertical walls 32 opposed to the outside of the right and left walls 7 of the cartridge case 1 preventing the shutter 30 from being disengaged from the cartridge case 1. The shutter 30 can be moved between a closed position where the front portion of the shutter 30 closes the opening of the pocket 20 when the shutter 30 is advanced frontward and an opened position where the shutter 30 opens the pocket 20 when the shutter 30 is retracted backward. When the shutter 30 is fully retracted, the holes 31 coincide with the drive shaft insertion holes 5 for allowing engagement of the drive shafts of the tape player with the hubs 3.

Referring to FIGS. 2 and 4 and FIGS. 12 and 13, a pair of engaging members 33 is projectingly formed inwardly on the front end and rear end of the top face of the vertical walls 32 of the shutter 30. A pair of slits 34 are defined along the butting portion of the top case half 1a and bottom case half 1b. When the shutter 30 is assembled in the cartridge case 1, engaging members 33 are placed inside of the cartridge with connecting member 33a slidably inserted in the slit 34, whereby the shutter 30 is prevented from disengagement from the cartridge case 1 by causing the engaging members 33 to be contacted to the inner face of the side walls 7 enabling the shutter 30 to be moved in either the front direction or rear direction. Portion 7a of the side wall 7 of the top case half 1a is projected outwardly from the side wall 7b of the bottom case half 1b at least along the sliding region of the shutter 30 and the outside surface of the side wall 7a of the top case half 1a is flush with the outside surface of the side wall 32 of the shutter 30.

Figure 3:
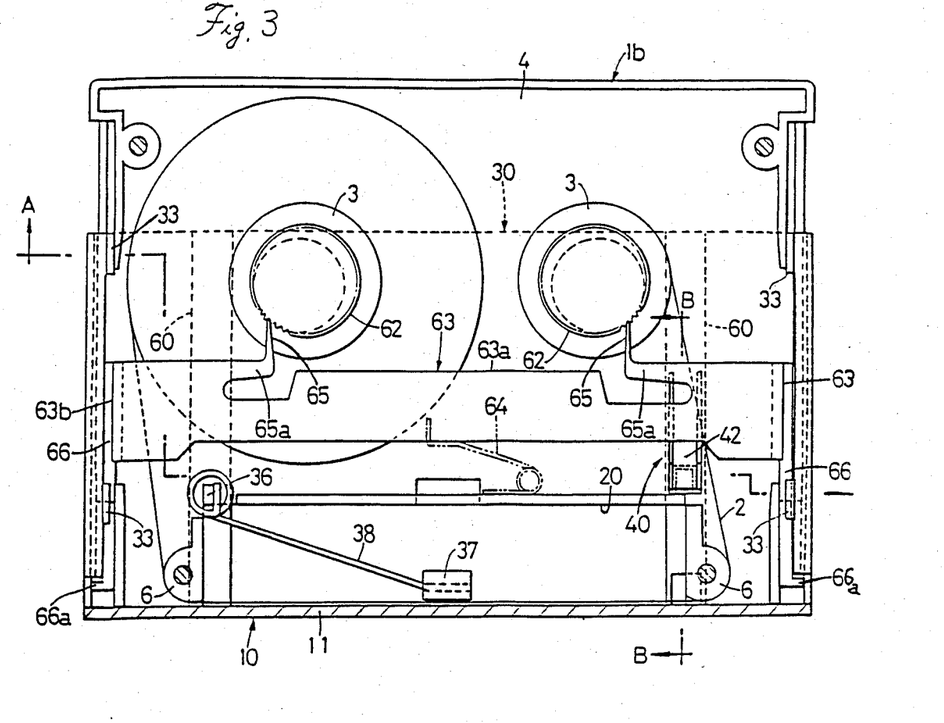
FIG. 3 is a top plan view showing the interior of the cartridge case according to the present invention.

In order to exert the shutter 30 frontward for closing the lower portion of the pocket 20 by the shutter the cartridge is not in use, there is provided a mechanism for exerting the shutter 30 frontward. As shown in FIG. 3, a resilient spring 38 is disposed between an inner member 36 and the spring receiving member 37 disposed in the inner surface of the shutter 30 so that the shutter 30 is exerted frontward. As the spring 38, various resilient members can be used in addition to the wire spring as shown in this embodiment.

In order to lock the shutter 30 in either the closed position or opened position, there is provided a locking mechanism 40. As the locking means 40 there is formed an elongated locking member 42 in an opening 41 defined at the central right hand portion of the bottom wall 4 with the rear end of the locking member 42 continued to the bottom wall 4 and the front end portion raised toward the outside of the bottom case half 1a. The front end portion of the locking member 42 can be resiliently moved in the vertical direction or inward and outward direction relative to the bottom wall 4 in a canti-lever manner. The free end portion of the locking member 42 is provided with an engaging chip 43 projected outwardly so that in the case of the free condition state of the locking member 42, the engaging member 43 is projected slightly outwardly from the bottom wall 4.

Figure 5:
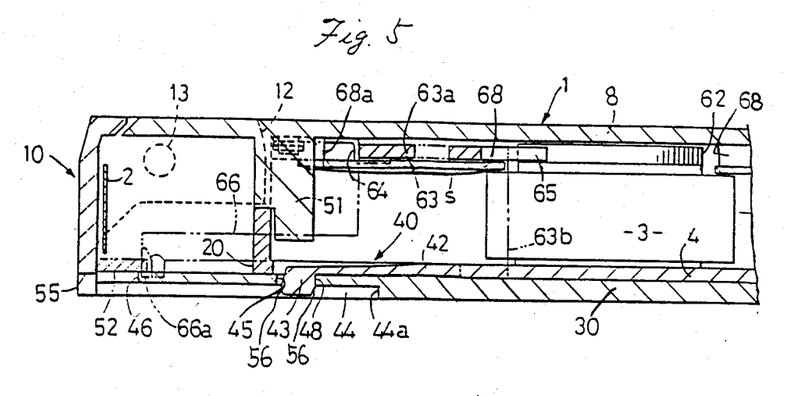
FIG. 5 is cross sectional view taken along the lines B—B in FIG. 3.
Figure 6:
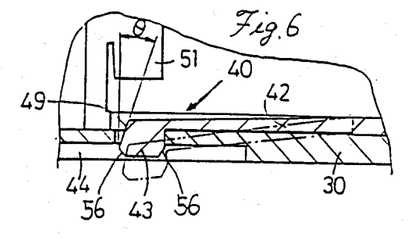
FIG. 6 is a partial top plan view showing an example of a locking mechanism of the shutter member when the cartridge is not in use.

The shutter 30 is provided with a guide slot 44 extending from the front portion of the bottom surface thereof towards the rear portion thereof with a first engaging hole 45 defined near the rear end of the guide slot 44 and a second engaging hole 46 defined at the front end of the guide slot. The rear end surface 44a of the guide slot 44 is positioned backward from the first engaging hole 45. By this arrangement, when the cartridge is not in use, and the shutter 30 is situated in the closed position, the engaging chip 43 can engage with the first engaging hole 45, as shown in FIG. 5, for preventing the movement of the shutter 30 in the front and rear directions, whereby the shutter 30 is locked in the closed position, since the shutter 30 is biased in the front direction by the spring 38 and vertical wall 48 formed on the upper portion of the back surface of the engaging chip 43 is engaged with the rear edge of the first engaging hole 46.

In place of using the arrangement as described above, the shutter 30 can be locked at the frontmost end by abutting the front end of the shutter 30 to some portion of the cartridge case 1, exerting the shutter 30 frontwardly by a resilient member (not shown).

In the locking mechanism as described above, the lower surface of the engaging member 43 is limited so as not project from the lower surface of the shutter 30 by supporting the locking member 42 by the upper surface of the shutter 30 and setting the thickness of the engaging chip 43 so that the engaging chip 42 does not erroneously engage with foreign matter.

It is appreciated that in a case where a foreign force is applied to the shutter in a backward direction, the front edge of the first engaging hole 45 can engage with an abutting surface 49 formed on the upper portion of the front surface of the engaging chip 43, thereby preventing motion of the shutter in the rearward direction. The abutting surface 49 is so slanted by the angle $\theta$ that the level of the rear portion thereof is high, whereby even if the front edge of the first engaging hole 45 is engaged with the butting surface 49, the engaging chip 43 is not lifted upward so as to assure the locking state.

Figure 7:
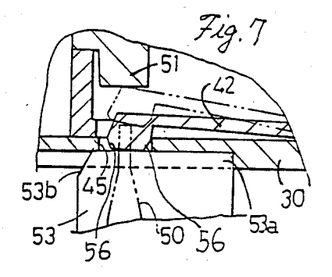
FIG. 7 is a partial top plan view showing the locking mechanism of FIG. 6 when the cartridge is in use.

When the cartridge is not in use, if foreign matter 50 or a finger pushes the engaging chip 43 upward as shown in FIG. 7 the engaging chip 43 may be deformed premanently. In order to avoid this, a limiting member 51 is provided just above the engaging chip 43 to inhibit the movement of the engaging chip 43. In the embodiment shown, the limiting member 51 is suspended from the top wall of the top case half 1a.

Although the second engaging hole 46 faces the opening of the pocket 20, dust or foreign matter seldom enter in the cartridge 1 through the second engaging hole 46, since the size of the hole is relativley small. However, in order to prevent entrance of the foreign matter, there may be provided a cover 52 projected from the front plate 11 of the front lid 10 so as to cover the upper portion of the second engaging hole 46, as shown by the phantom line in FIG. 5, if necessary.

When the cartridge is inserted into the tape player from the front at a horizontal attitude of the cartridge, in the course of insertion of the cartridge, a lock releasing member 53 of the tape player can enter in the guide slot 44 through the opening 55 defined in the right side portion of the front plate 11 of the front lid 10, as shown in FIGS. 2 and 3, then the lock releasing member 53 engages with the engaging chip 43, as shown in FIG. 7, lifting the chip 43 up. Thus, the corner 53a with slanted surface at the rear side of the lock releasing member 53 can abut onto a sliding surface 56 which is slantedly formed on the lower portion of the front side of the engaging chip 43, thereby lifting the engaging chip 43 up. Subsequently, the lock releasing member 53 can abut onto the rear surface 44a of the guide slot 44, whereby the shutter 30 is prevented from advancing in the front direction. By further insertion of the cartridge 1 toward the interior of the tape player, the sliding surface 56 rides on the front edge of the first engaging hole 45, then the sliding surface 56 rides on the inner face of the shutter 30. In case where the cartridge 1 is fully mounted on a holder of the tape player, the engaging chip 43 is engaged in the second engaging hole 46 as shown by the phantom lines in FIG. 8, whereby the vertical surface 48 is adapted to be engaged with the rear edge of the second engaging hole 46, so that the shutter 30 is prevented from being moved in the front direction.

Figure 8:
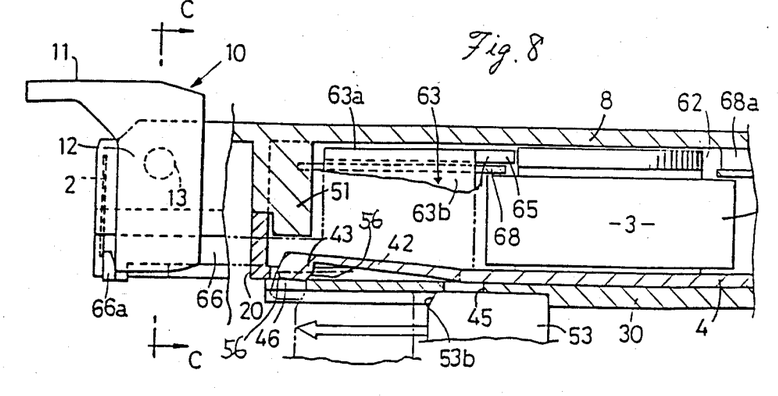
FIG. 8 is a cross sectional view taken alone the lines A—A when the cartridge is in use.

In order to take the cartridge 1 out from the holder of the tape player, the cartridge 1 is moved toward the exterior of the tape player with the holder, namely the cartridge 1 is moved backward. In this case, the lock releasing member 43 of the tape player is moved in the front direction, as indicated by the arrow mark as shown in FIG. 8, relative to the cartridge 1 and a slanting face 57 formed on the lower portion of the rear face of the engaging chip 43 is adapted to ride on the top portion 53b of the lock releasing member 53. Further, the engaging chip 43 rides on the inner upper face of the shutter 30, so that the engaging chip 43 can be disengaged from the first engaging hole 45. Upon removing the cartridge 1 fully out of the holder, the engaging chip 43 can be again engaged in the first engaging hole 43 for returning to the original condition.

Figure 4:
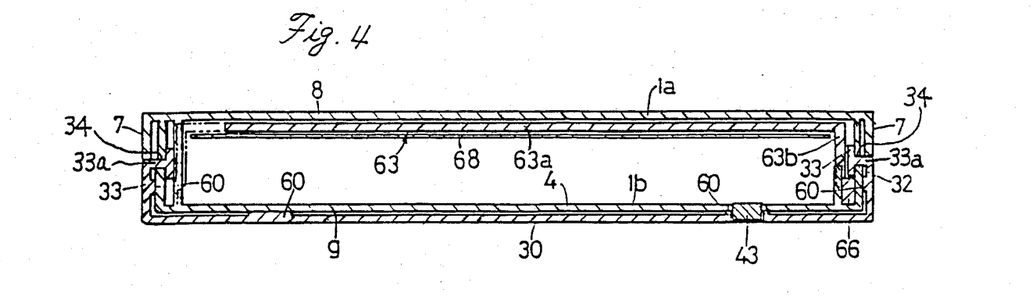
FIG. 4 is a cross sectional view taken along the lines A—A in FIG. 3.

A shutter guide mechanism is provided for assuring a smooth movement of the shutter 30 according to the present invention. Referring to FIGS. 1(a), 1(b) and FIG. 4, there are formed a plurality of straight ribs 60 extending in the longitudinal direction on the respective inner faces of the main plate 39, and vertical walls 32 of the shutter 30. These ribs 60 are attached to slidably contact with the outer faces of bottom wall 4 of the bottom case half 1a. It is appreciated that the guide slots 44 on the vertical walls of the shutter 30 are defined using the difference in the thickness of the rib 60 and other wall portion.

Also it is appreciated that provision of the ribs 60 serves to reinforce the mechanical strength of the shutter 30 together when the thickness of the main plate 39 and the vertical walls 32.

The ribs 60 of the main plate 39, which are contacted with the bottom face of the cartridge 1, serve to absorb the undesired effect of play between the shutter and the bottom face of the cartridge 1 and the ribs 60 of the vertical walls, which are contacted with the side walls of the cartridge 1, serve to absorb the undesired effect of the play between the vertical walls 32 and the side walls 7 of the cartridge 1. Furthermore, the ribs 60 provide a gap g between the shutter 30 and cartridge 1 and the shutter 30 is moved through the slidable contact between only the ribs 60 and the cartridge 1.

The size, shape and position of the ribs 60 can be selected as desired depending on the condition such as thickness and shape of the shutter 30. For example, the top end of the ribs 60 may be formed into a round shape. Also each of the ribs may be divided into a plurality of ribs, as shown in FIG. 10. The ribs 60 may be formed either only on the outer face of the cartridge 1 or on both faces of the shutter and the cartridge 1. Further, the ribs 60 may be formed only on the vertical walls 32 of the shutter 30. In place of providing only ribs 60, ribs and grooves may be formed on the shutter 30 and the bottom case half 1a in a dovetail shape, slidable with each other while preventing disengagement. In any case, the ribs and/or grooves may be formed either on the main plate and vertical walls of the shutter and/or on the outer face of the cartridge 1.

There is provided a hub locking mechanism for preventing rotation of the hubs, for keeping the recording tape stretched when not in use, since if the recording tape is loosened, there may occur failure of tape loading or other trouble.

Referring to FIGS. 3 and 5, each of the hubs 3 is provided with an engaging plate 62 of round shape above and with a smaller diameter than the main portion of the hub 3 on which the recording tape 2 is wound and the peripheral edge of the engaging plate is provided with a plurality of slots each extending in the vertical direction.

A brake member 63 made of a plastic plate is situated in the cartridge 1. The brake member 63 is formed of a brake plate 63a, and legs 63b extending downwardly from the both ends of the brake plate 63a. The brake member 63 is placed frontwardly relative to the hubs 3 so as to move below the top wall of the top half 1a avoiding any interference with the components disposed in the cartridge 1 particularly with the recording tape 2 in such a manner that the brake member 63 is placed across the cartridge 1 between the side walls 7 with the lower face of both legs 63b slidably supported on the inner face of the bottom wall 4 of the bottom case half 1b, having both the outer side faces of the legs slidably contacted with the inner surfaces of the side walls 7. By this arrangement, the brake member 63 can be moved in the longitudinal direction or frontward and backward directions without play. There is provided a spring member 64 between the brake member 63 and cartridge 1 so that the brake member 63 is normally exerted in the backward direction by the spring member 64. In this example the spring member 64 is suspended between the brake plate 63a and the top wall 8 of the cartridge 1. Shape and position of the spring member 64 can be selected as desired.

Engaging projections 65 are projected in the backward direction from the rear end of the engaging plate 63a as shown in FIGS. 3 and 8 so that the engaging projections 65 can detachably engage with any of the engaging slots 62 of the hub 3. The engaging projections 65 can be resiliently bent laterally and the foot portion 65a can be resiliently bent longitudinally. Position of the respective engaging projections 65 is so determined that normally the engaging projections 65 are positioned outward from the center of each hub 3 and when the hubs 3 are to be braked, the engaging projections 65 can be advanced toward the engaging plate 62 so that the engaging projections 65 can engage in any one of the slots of the engaging plate 62 from the front. A guide member 66 is formed at the foot portion of each leg 63b so as to extend in the front and rear directions, whereby the guide member 66 slides on the bottom wall 4 and the lateral side face of the guide member 66 can slide on the inner face of the side wall 7. The front end portion of the guide member 66 is bent upwardly as shown by 66a, and the front end portion 66a is projected outwardly of the cartridge 1 below the connecting arm 12 of the front lid 10.

More specifically, the outer surface of the front end portion 7a of the side walls 7 to which the connecting arm 12 is stepped engaged is inwardly, and the outer surface of the front end portion 7b of the bottom case half 1b is further stepped inwardly relative to the front end portion 7a. The guide member 66 is adapted to closely face the outer face of the front end portion 7b, and is supported by a receiving wall 67 projected outwardly from the bottom case half 1b. In such configuration, the guide member 66 is situated inwardly relative to the outer surface of the side wall 7 of the top case half 1a and only the end portion 66a of the guide member 66 is placed outwardly of the outer surface of the side wall 7 of the top case half 1a.

Referring to FIGS. 4 and 5, there is suspended a sheet 68 made of a rigid material below the top wall 8 of the top case half 1a with a slight gap therebetween. The sheet 68 is fixed to connecting ribs 68a projected from the top wall 8, so that the brake plate 63a can be slidably inserted in the gap between the sheet 68 and the top wall 8. A slip sheet s is laid below the lower surface of the sheet 68. By this arrangement, it is now possible to assemble the brake member 63 to the top case half 1a using the sheet 68 before the top case half 1a is assembled to the bottom case half 1b preventing the recording tape 2 from being scratched due to undesired contact of the recording tape to the brake plate 63a.

When the cartridge 1 is not in use, the brake member 63 is exerted in the backward direction by the spring member 64 as shown in FIG. 3, with the engaging projection 65 engaged in the slot of the engaging plate 62 of the hub 3 so as to apply a braking force to the hubs 3. Both engaging projections 65 can engage with both of the brake plates 63a of the hubs 3 respectively even if one of the hubs 3 is displaced from the predetermined position due to clearance, partly because the engaging projections 65 can be resiliently bent in the lateral direction, partly because the root portion of the engaging projection can be resiliently bent in the longitudinal direction and partly because the respective engaging projections 65 are displaced outwardly, whereby such a fault condition whereby only one of the hubs 3 is braked, can be avoided. As shown in FIG. 11, the engaging projections 65 have their free end portions formed with rough faces 65b for fascilitating engagement with the engaging members 62.

When the cartridge 1 is mounted on the tape player, the front lid 10 is moved upward to be opened. Following this operation, the connecting arms 12 of the front lid 10 are engaged with the rear surface of the end portion 66a of the guide member 66 from above, thereby causing the brake member 63 to be slightly moved frontward against the force of the spring member 64. Thus, the engaging members 65 are disengaged from the engaging plates 62 of the hubs 3, so that the hubs 3 are released from the locked state.

Under normal conditions, each of the connecting arms 12 of the front lid 10 does not engage with the front end of the guide member 66. However, since the space between the connecting arm 12 and the guide member 66 is small, the guide member 66 may projected outside of the side wall 7a of the top case half 1a. In such a case, the connecting arm 12 may contact with the top end portion of the guide member 66 and a serious problem may occur. In order to avoid such a condition, the top end portion of the guide member 66 is formed in a round shape 69 or is chamferred.

When the cartridge 1 is mounted on the holder of the tape player, the shutter 30 is opened as mentioned above. Subsequently, the holder is moved downward. During movement of the holder, a member of the tape player opens the front lid 10. When the holder is placed at a loading position, the loading member of the tape player enters the pocket 20 and the driving shafts are engaged in the driving shaft insertion holes 5. Since the timing of releasing the brake is delayed, the hubs 3 are released from the braking condition after the drive shafts of the tape player are inserted in the drive shaft insertion holes of the hubs, whereby the recording tape 2 is always maintained stretched.

Although one preferred embodiment of the tape cartridge according to the present invention is described above, various modifications can be made as described below.

Figure 14:
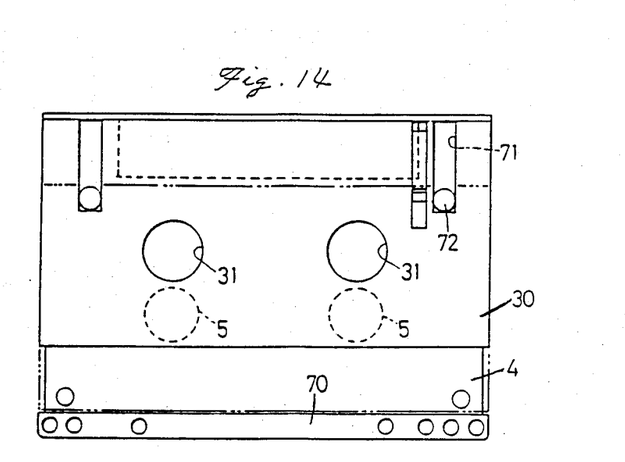
FIG. 14 is a bottom plan view showing another embodiment of the shutter mechanism according to the present invention.
Figure 15:
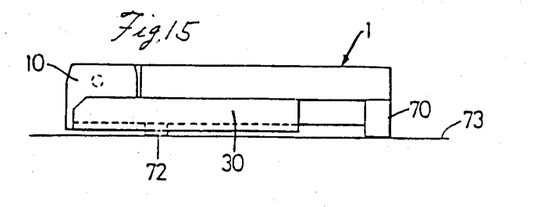
FIG. 15 is a side view of FIG. 14.

For example, in a case where the cartridge 1 is mounted to the holder of the tape player by defining the cartridge 1 as a standard, it might be desirable to make the outmost lateral size of the cartridge 1 equal to or larger than the outmost lateral size of the shutter 30. Furthermore, as shown in FIG. 14 and 15, a rear edge 70 is projected in the backward direction from the bottom wall 4 of the bottom case half 1b over the lateral length of the cartridge 1. Also, a pair of elongated holes 71 extending in the longitudinal direction may be defined in the left and right side portions of the front portion of the shutter 30. A pair of guide pins 72 are downwardly projected from the bottom wall 4 of the bottom case half 1b in a manner such that the guide pins 72 are downwardly projected from the shutter 30 through the holes 71. In this modification the bottom face of the rear edge 70 and the bottom face of the guide pins 72 may be used as the standard surface. By this arrangement, when the cartridge is not in use, the bottom face of the shutter 30 does not contact with a laying surface 73, such as a desk or the like, whereby if the cartridge slides on the laying surface 73, undesired force in not applied to the shutter 30. In addition, when the cartridge 1 is loaded on the holder of the tape player, the shutter 30 can be moved backward with the cartridge 1 fixed on the holder.

Figure 16:
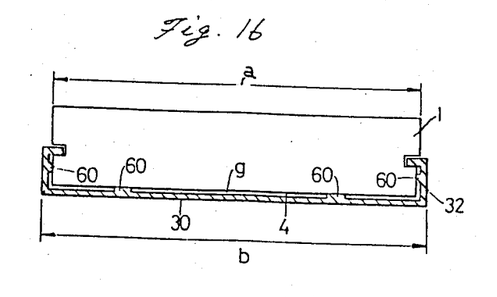
FIG. 16 is a cross sectional view showing a further modification of the shutter member.
Figure 17:
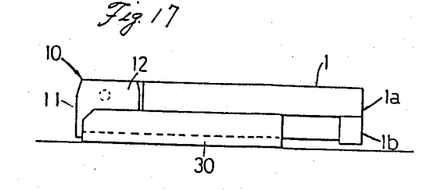
FIG. 17 is a side view of FIG. 16.

To the contrary, when the shutter 30 is the standard surface, it is desired that the outmost lateral size (b) of the shutter 30 be larger than the outmost lateral size (a) of the cartridge 1 as shown in FIGS. 16 and 17 and the lower end of the front plate 11 of the front lid 10 is not projected from the lower end face of the shutter 30.

Figure 18:
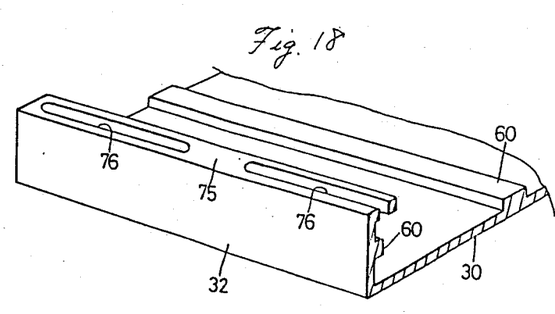
FIG. 18 is a partial perspective view showing the shutter member.
Figure 19:
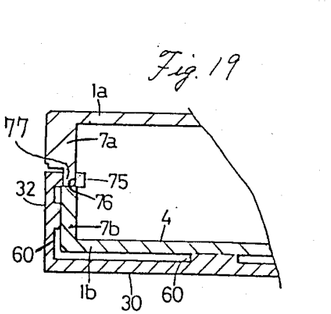
FIG. 19 is a partial cross sectional view showing the shutter member mounted in position.

FIGS. 18 and 19 show one modification of the mechanism for preventing disengagement of the shutter 30 from the cartridge 1, wherein a flange 75 is projected inwardly from the top end of each of the vertical walls 32. A pair of elongated holes 76 is defined in the flange 75 so as to extend in the longitudinal direction, so that guide pins 77 are engaged in the holes 76, whereby the shutter 30 is prevented from being disengaged from the cartridge 1. In this arrangement the mating of the guide pins 77 in the holes 76 enables both the prevention of the disengagement of the shutter 30 and the guiding of the movement of the shutter.

Figure 20:
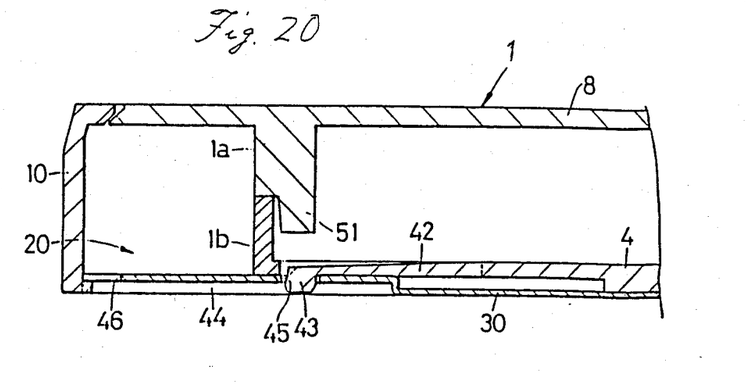
FIG. 20 is a cross sectional view showing an essential portion of another embodiment of the shutter member.
Figure 21:
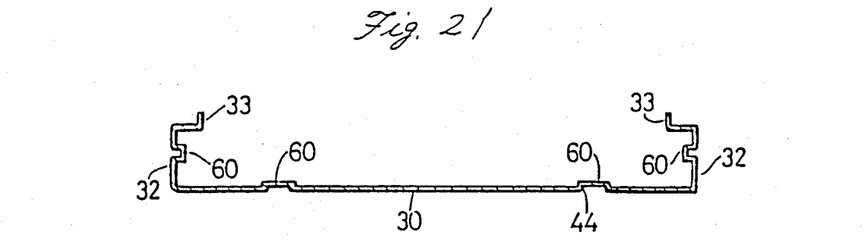
FIG. 21 is a cross sectional view of the shutter member.

FIGS. 20 and 21 show an example of shutter 30 formed of metal. By using metal the shutter 30 may be thin keeping the desired mechanical strength. There is provided ribs 60 by bending the metal in generally a U character shape so as to reinforce the shutter 30.

Figure 22:
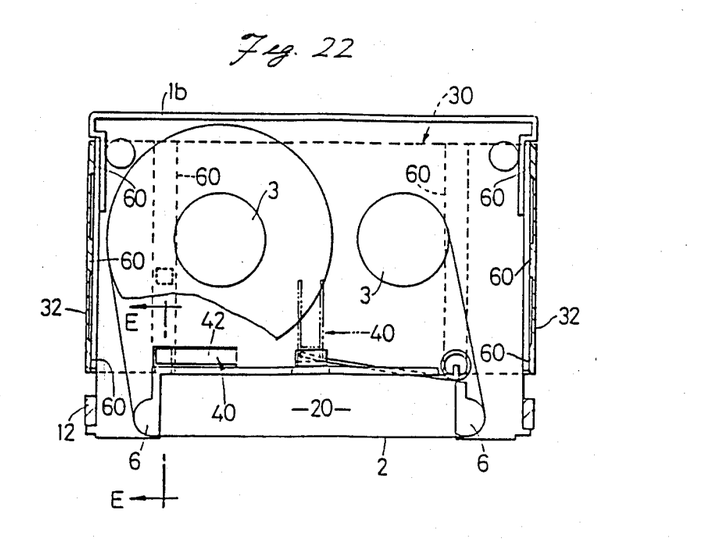
FIG. 22 is a top plan view showing an example of arrangement of a locking mechanism of the shutter member.
Figure 23:
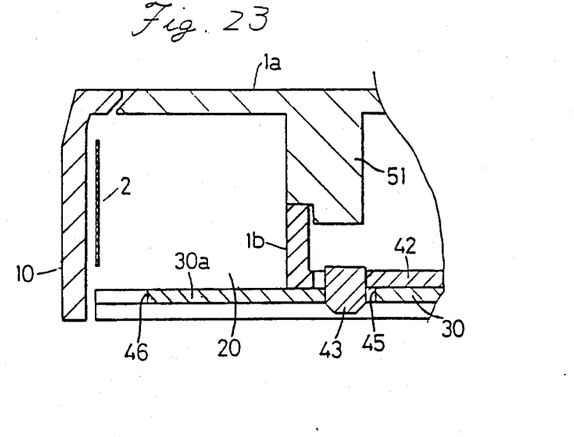
FIG. 23 is a cross sectional view taken along the lines E—E.

FIGS. 22 and 23 show a modification of the mechanism of locking the shutter, wherein the shutter locking mechanism 40 is disposed in the lateral direction. By this modification, if a force to move the shutter 30 in the backward direction is applied with the engaging chip 43 engaged in the holes 45, the locking member 42 is not deformed so that the locking of the shutter can be assured. In a case where the locking chip 42 is formed in the longitudinal direction, by placing the engaging chip 43 in the rear end of the locking chip 42, since the engaging chip 43 can be engaged with the locking chip 42 when the force is applied to the shutter for opening, the locking chip 42 is prevented from being bent. The locking mechanism 40 may be disposed in the central portion relative to the lateral direction, as shown by the phantom lines in FIG. 22, whereby the condition that only one hub is braked can be prevented. The shutter locking mechanism 40 may be disposed in a space between the side wall 7 and the vertical wall 32 of the shutter.

Figure 24:
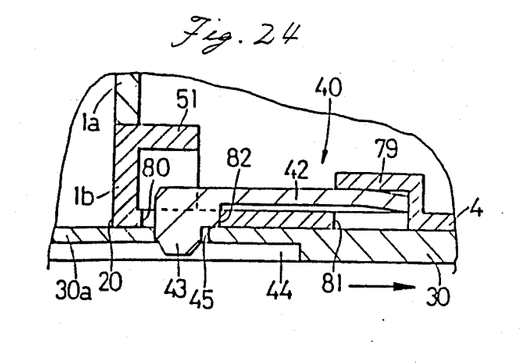
FIG. 24 is a partial cross sectional view showing an example of a part of the locking mechanism of the shutter member when the cartridge is not in use.
Figure 25:
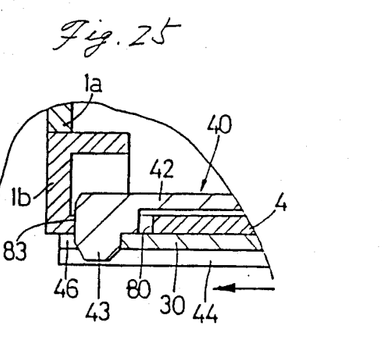
FIG. 25 is a partial cross sectional view showing the locking mechanism of FIG. 24 when the cartridge is in use.

FIGS. 24 and 25 show a further modification of the shutter locking mechanism 40, wherein a reversed L shaped member 79 is formed on the bottom wall 4 of the cartridge 1 and a locking chip 42 which is made separately from the bottom wall 4 and having engaging chip 43 is fixedly inserted from lateral side. Further a hole 80 is defined in the bottom wall 4 so that the engaging chip 43 can be engaged alternately in any one of the first hole 45 and second hole 46 through the hole 80. In FIGS. 24 and 25, reference numeral 81 denotes a through hole for preventing undercut in the reversed L shaped member 79. The width of the base portion of the locking chip 42 is larger than the width of the through hole 81 so as to receive the base portion of the locking chip 42 by the bottom wall 4 assuring resiliency of the base portion of the locking chip 42 for enabling the downward movement of the engaging chip 43. In this modification in a case where the engaging chip 43 is engaged in the first hole 45 as shown in the first embodiment, when the force for opening the shutter 30 is applied as shown in FIG. 24, the receiving surface 82 of the engaging chip 43 is recieved by the edge of the hole 80. When the engaging chip 43 is engaged in the second engaging hole 46 as shown in FIG. 25, by application of the force for closing the shutter 30, as shown by the arrow mark, another receiving face 83 of the engaging chip 43 is received by the edge of the opening facing to the hole 80, thereby preventing deformation of the locking chip 42.

Figure 26:
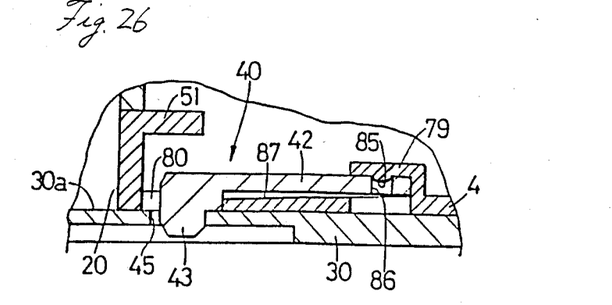
FIGS. 26 through 30 are respectively cross sectional views showing various modification of the locking mechanism of the shutter member.
Figure 27:
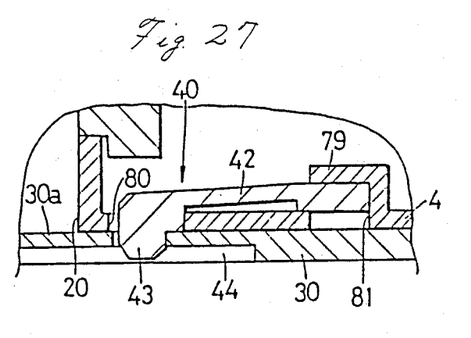

FIGS. 26 and 27 show another modification of supporting the locking chip 42 formed separately.

In FIG. 26, the base portion of the locking chip 42 is fixed by engagement of a projection 85 in a hole 86. In addition the inner surface of the bottom wall 4 which receives the locking chip 42 is slanted so that the locking chip 42 can be surely engaged in the holes 45 and 46 of the shutter 30. In FIG. 27, the base portion of the locking chip 42 is made thick so as to assure mating of the engaging chip 42 with the holes 45 and 46 and preventing disengagement of the engaging chip from the reversed L shape member 79.

Figure 28:
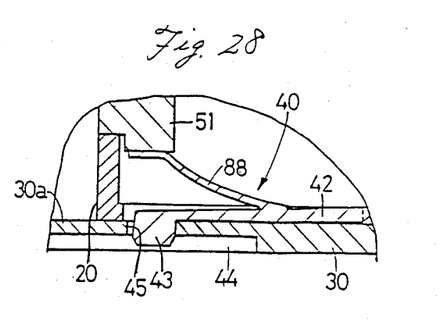
Figure 29:
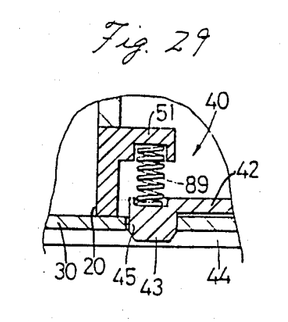

Referring to FIG. 28, a resilient plate member 88 is protruded upwardly from the locking chip 42. The free end portion of the plate member 88 is adapted to resiliently engage with the lower end face of the suppressing member 51, whereby the locking chip 42 is fixed and the engaging chip 43 is surely engaged in the holes 45 and 46. In FIG. 29, a compressed coil spring 89 is fitted between the engaging chip 43 and the suppress member 51 to fix the locking chip 42. The locking chip 42, shown in the modifications in FIGS. 28 and 29, may be a separate one or a member formed integral with the bottom wall 4.

Figure 30:
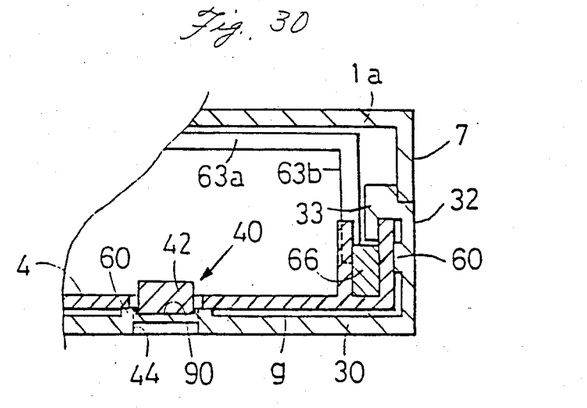

In the modification shown in FIG. 30, there is defined a slot 90 in the inner face of the shutter 30 for accommodating the locking chip 42. The slot 90 is defined in the upper surface of the projection 60 having the guide slot 44. By this arrangement, the locking chip 42 is prevented from a swinging motion. The slot 90 may be formed in the inner face of the bottom wall 4 for the same purpose.

Figure 31:
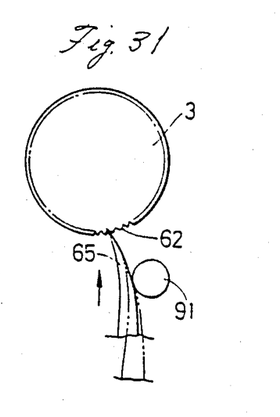
FIG. 31 is a top plan view showing another embodiment of the hub stopping mechanism.

FIG. 31 shows a modification of the engagement of the engaging chip 65 and the engaging plate 62 of the hub 3. In this modification, a guide pin 91 is vertically suspended from the top wall 8 of the top case half 1a so that the engaging member 65 is normally contacted with the outer peripheral surface of the guide pin 91 when the brake member 63 is in its movable range, whereby it is assured that the end of the engaging member 65 can be engaged with the slot of the engaging plate 62. More specifically, when the brake member 63 is in the braking position, the end of the engaging chip 65 is biassed toward the center of the hub 3 guided by the guide pin 91 to assure engagement of the engaging chip 65 with the engaging plate 62. To the contrary, when the brake member is in the released position, the end of the engaging chip 65 is displaced away from the engaging plate 62 and displaced from the center of the hub 3, whereby release of the engaging chip from the engaging plate 62 is assured by a small distance of the movement of the brake member 63.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge comprising a cartridge case having a bottom portion, a pocket formed in a front portion of said cartridge case in the form of an opened space for enabling tape loading, a shutter means mounted to said bottom portion of said cartridge case so as to move in a frontward and backward direction of the cartridge case along a bottom face of said cartridge case for opening and closing a lower opening of said pocket, rib means formed on an inner face of said shutter means facing toward said cartridge case so as to slidably partially contact said cartridge case and a guide slot formed on an outer face of said shutter means at a position opposite to said rib means for guiding a lock releasing member of a tape player when the latter is introduced into the inside of said cartridge case.

2. The tape cartridge according to claim 1, further including means for locking said shutter means in a closed position situated at a portion of a bottom wall of said cartridge case corresponding to said guide slot of said shutter.

3. The tape cartridge according to claim 2, wherein an engaging hole is defined at front and rear ends of said guide slot engaging with said locking means.

4. A tape cartridge comprising a cartridge case, a pocket with a lower opening formed in a front portion of said cartridge case for enabling tape loading and a shutter means mounted to said cartridge case so as to move in both frontward and backward directions of said cartridge case along a bottom plate of said cartridge case for opening and closing said lower opening of said pocket, said shutter means including a main wall facing a bottom plate of said cartridge case having left and right half portions, with rib means formed on an inner surface of said left and right half portions of said main wall of said shutter means projecting toward the bottom plate of said cartridge case thereby allowing said shutter means to slidably move in partial contact with a bottom face of said bottom plate of said cartridge case.

5. The tape cartridge according to claim 4, wherein said shutter means is made of plastic resin.

6. The tape cartridge according to claim 4, wherein said shutter means is made of metal.

7. The cartridge according to claim 4, wherein said shutter means comprises a pair of vertical walls protruded vertically from said left and right end portions of said main wall.

8. The tape cartridge according to claim 7, wherein said rib means are formed on said inner surface of a central portion of said main wall with vertical walls with respect to the top and bottom directions, and extending in a frontward and backward direction.

* * * * *